May 19, 1964 — J. O. WHITCOMB — 3,133,562
BOOK BINDING MACHINE
Filed Jan. 29, 1960 — 12 Sheets-Sheet 1

INVENTOR
JOHN O. WHITCOMB
BY *John F. Phillips*
ATTORNEY

May 19, 1964     J. O. WHITCOMB     3,133,562
BOOK BINDING MACHINE
Filed Jan. 29, 1960     12 Sheets-Sheet 2

INVENTOR
JOHN O. WHITCOMB
BY John F. Phillips
ATTORNEY

May 19, 1964 — J. O. WHITCOMB — 3,133,562
BOOK BINDING MACHINE
Filed Jan. 29, 1960 — 12 Sheets-Sheet 4

INVENTOR
JOHN O. WHITCOMB
BY John F. Phillips
ATTORNEY

May 19, 1964 J. O. WHITCOMB 3,133,562
BOOK BINDING MACHINE
Filed Jan. 29, 1960 12 Sheets-Sheet 6

INVENTOR
JOHN O. WHITCOMB
BY John F. Phillips
ATTORNEY

United States Patent Office 3,133,562
Patented May 19, 1964

3,133,562
BOOK BINDING MACHINE
John O. Whitcomb, Mechanicsburg, Pa., assignor, by mesne assignments, to Freundlich-Gomez Machinery Corporation, College Point, N.Y.
Filed Jan. 29, 1960, Ser. No. 5,469
11 Claims. (Cl. 140—92.3)

This invention relates to a book binding machine, and more particularly to a machine of the type which inserts and fixes in position the helical binders commonly employed, for example, in the making of stenographers' notebooks.

The apparatus contemplates the use of a movable structure, specifically in the present instance a reel movable step by step to successive work stations, in the first of which the assembled parts of successive notebooks are clamped in proper position with respect to the movable structure. The present invention has particularly to do with the first station of such an apparatus.

An important object of the invention is to provide a movable structure of the character referred to having grooved hooks insertable through the openings in one end of a note book to position all of such openings for the reception of the helical wire to be fed therethrough, the grooving of the hooks facilitating the passage of the wire through the openings in which such hooks are arranged, and to provide novel means for clamping each successive book in position with the hooks inserted through certain of the book openings.

A further object is to provide such an apparatus having a novel means for supplying successive books to the first of the stations for the engagement of certain openings of the book with the grooved hooks referred to.

A further object is to provide such an apparatus wherein the grooved hooks are associated with movable jaw members for engaging each book to hold it in proper position with respect to the movable structure, and to provide novel means for moving each successive book relative to the grooved hooks for the insertion thereof in certain of the openings in the book.

A further object is to provide novel means for feeding successive books to a position adjacent the free ends of the hooks and to provide means operative when a book reaches such position for forcing it toward the hooks for the insertion of the latter in certain of the book openings, together with means for clamping the book in proper position relative to the hooks.

A further object is to provide an apparatus of this character wherein the grooved hooks are inclined to correspond to the pitch of the helical wire to be inserted through the book openings; to provide means for feeding each successive book to a position in which the openings are adjacent the hooks; to slope the edges of the book to cant the leaves of the book to incline the openings thereof to an angle corresponding to the inclination of the grooved hooks, and to provide means for moving the book angularly toward the hooks to facilitate the entrance of the latter through certain of the book openings.

A further object is to provide means automatically operative when the book is positioned in the manner referred to, to effect movement of the book toward the hooks for the insertion of the latter through certain of the book openings, and to provide automatic means forming a part of the movable structure for clamping the book relative to the movable structure after the hooks have been inserted through certain of the book openings.

A further object is to provide novel means for feeding each successive book to the movable structure and to provide novel parallel side guides between which the book is moved and which side guides have book-engaging surfaces inclined from the vertical at an angle corresponding to the inclination of the hooks, and to provide novel hold-down means for preventing one edge of the book from riding upwardly relative to its adjacent guide as the book is moved into position relative to the hooks.

A further object is to provide novel coordinated cams for controlling the functions of feeding the book toward the movable structure, moving the book relative to the hooks for positioning the latter in certain of the book openings, withdrawing the feeding and lifting means slightly from the movable structure, releasing the clamping jaws for movement into engagement with each other to fix the book relative to the movable structure and retracting the feed means preparatory to the next operation of feeding a book to the movable structure.

Other objects and advantages of the invention will become apparent during the course of the following description.

In the drawings I have shown on embodiment of the invention. In this showing:

FIGURE 15 is a similar view showing the cams in a final position for completing the operation controlled by the cams.

Figure 1:
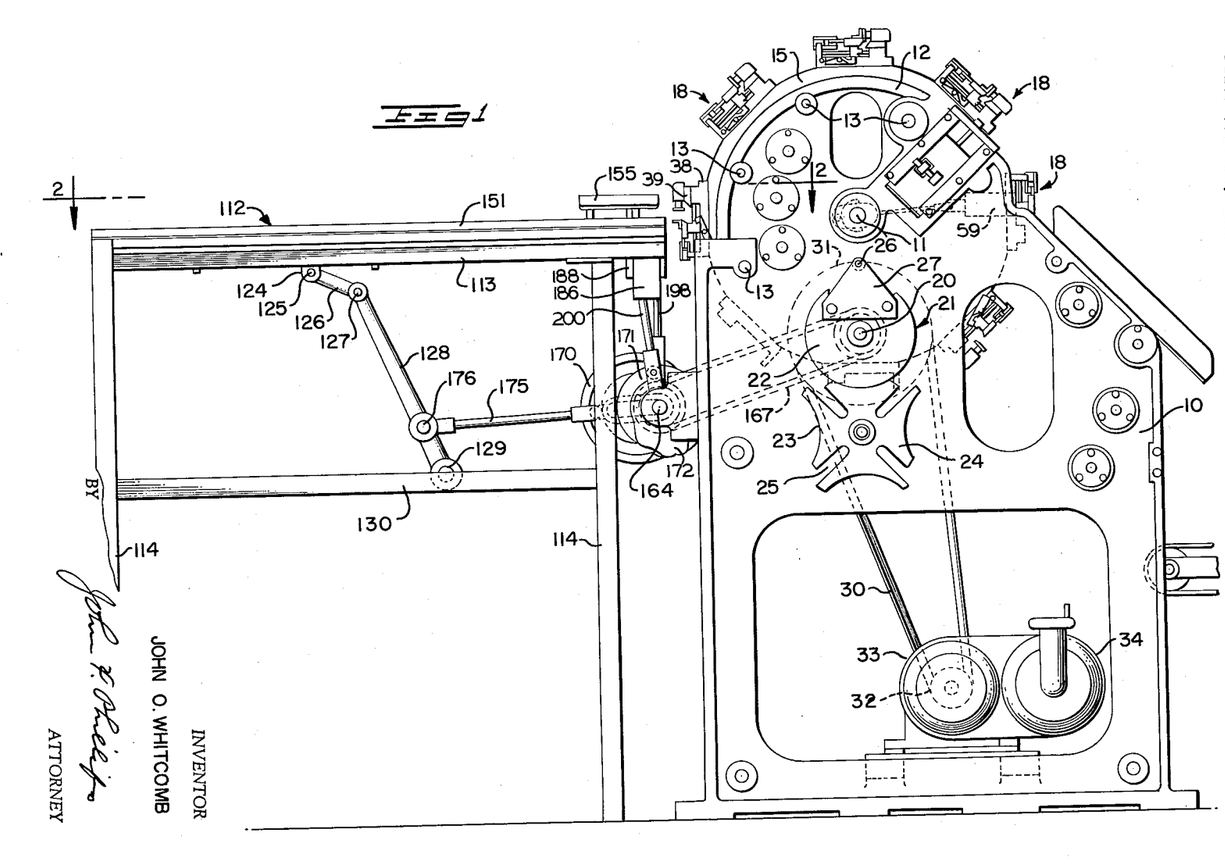
FIGURE 1 is a side elevation of the apparatus.
Figure 2:
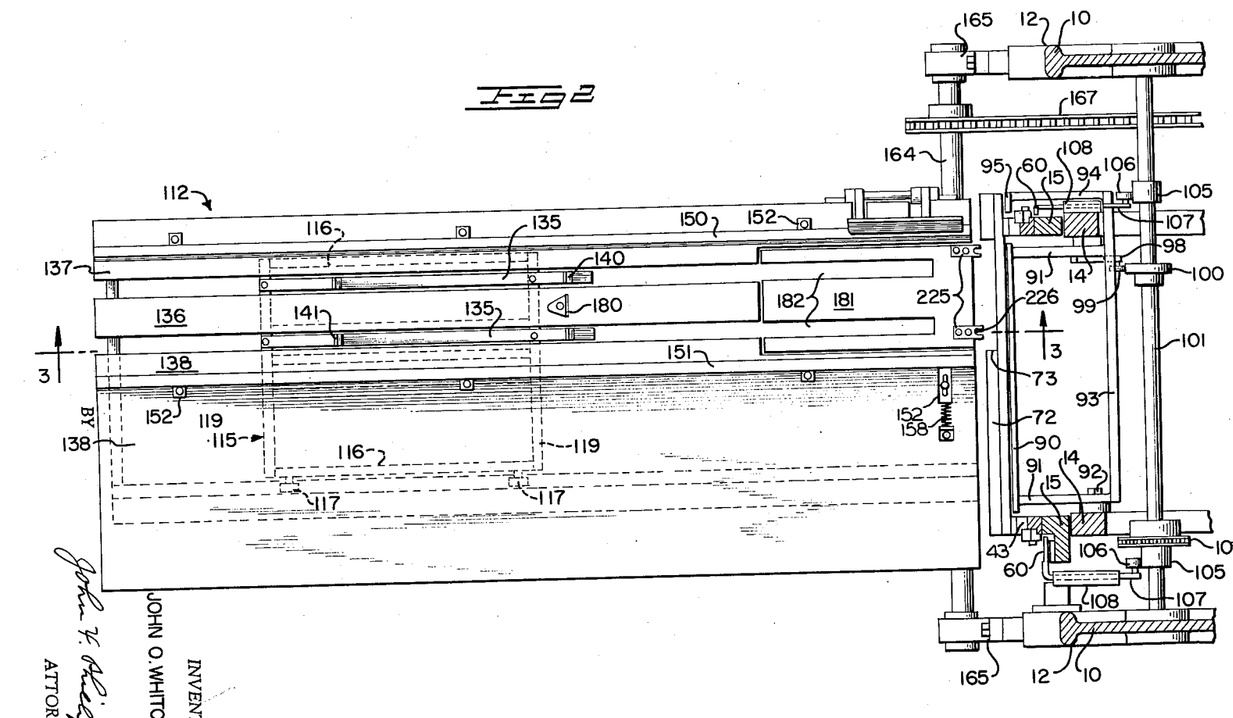
FIGURE 2 is a horizontal sectional view on line 2—2 of FIGURE 1.

Referring to FIGURES 1 and 2, the numeral 10 designates a pair of relatively heavy cast side frame members supporting the part of the main mechanism with which the present invention is associated. These side frames support a transverse shaft 11. The side frames 10 are provided with upper substantially semi-circular portions 12, and the side frame members carry inwardly projecting stub shafts 13 circumferentially spaced, only a few of which stub shafts are shown in FIGURE 1. These stub shafts are connected to and support relatively heavy spaced rings 14 (FIGURE 2), and rotatable on such rings is a pair of rotary reel members 15, guided in their rotational movement about the rings 14 in any suitable manner (not shown).

The members 15 constitute a reel which supports in circumferentially spaced relation a plurality of book clamping devices, each indicated as a whole by the numeral 18, described in detail below. These book clamping devices are advanced from station to station around the mechanism for the performance on books clamped thereby of the various operations necessary for the completion of a bound book such as a standard stenographer's notebook having a spiral binding hinge. Most of the apparatus for performing the various functions of the mechanism forms no part of the present invention and will not be described in detail. These functions, generally speaking, are the clamping of the unbound book in position, the advancing of the reel to a second stage by means to be described below for the insertion of the helical binder, the advancing of the clamping devices to a third position where the excess wire ends of the binder are clipped and the ends looped over, the advancing of the book to the next stage where the bent ends of the wire are welded to one of the coils, and the advancing of the book to the final stage where the bound book is released and discharged from the apparatus. The present invention is concerned with the performance of the first operation of positioning and clamping the book for the proper performance of the following operations.

Referring to FIGURE 1, the side frame members support a main drive shaft 20 which carries one portion of a Geneva gear indicated as a whole by the numeral 21. Such portion of the Geneva gear comprises a plate 22 having a circular outer edge engageable with the arcuate cut-outs 23 of the second portion 24 of the Geneva gear having the usual slots 25 therein engageable by a pin 26 carried by a plate 27 secured to the member 22. It will be understood that the step-by-step rotation of the Geneva gear member 24 rotates the reel 15 to advance it step by step to its various stations. Since the particular drive means for advancing the reel forms no part of the present invention, the connection between the Geneva gear member 24 and the reel 15 has not been illustrated.

The shaft 20 is driven by a belt 30 which passes around a pulley 31 on the shaft 20 and is driven by a pulley 32 carried by a reduction unit 33 driven by a motor 34 supported by the main frames 10.

Figure 9:
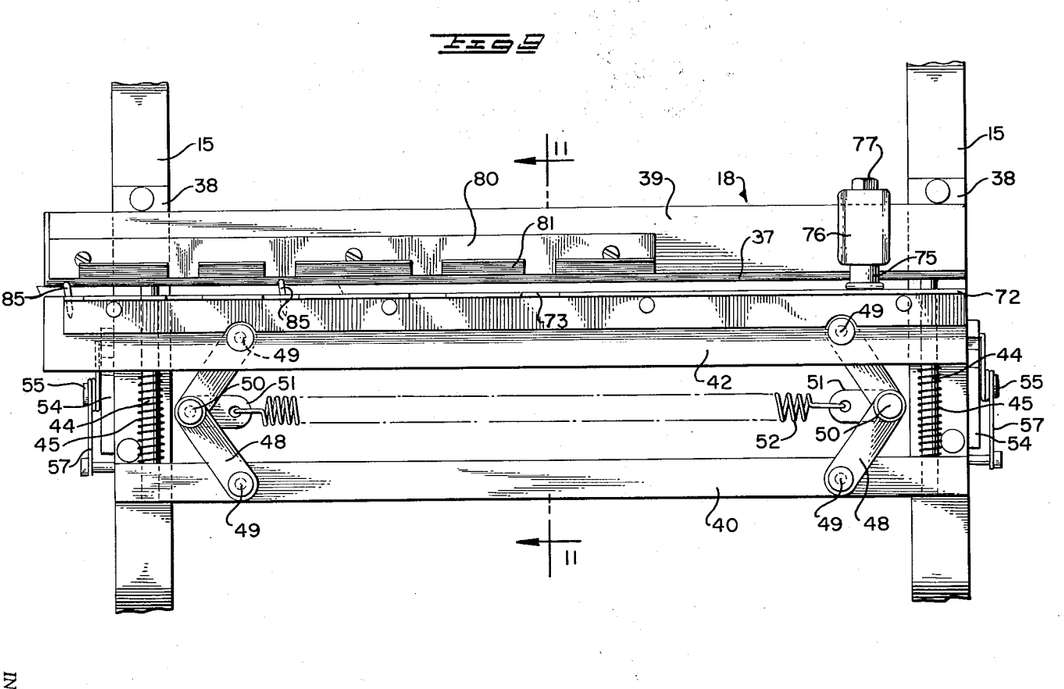
FIGURE 9 is an enlarged fragmentary elevational view of a portion of the mechanism taken on line 9—9 of FIGURE 3.
Figure 10:
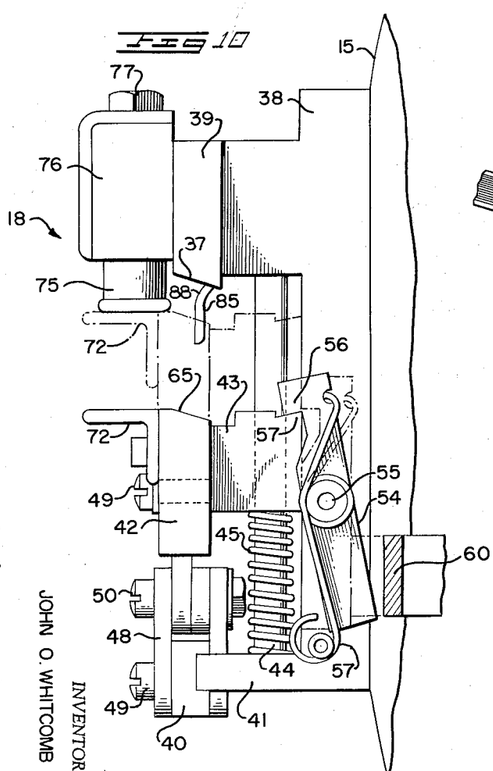
FIGURE 10 is an enlarged fragmentary elevation looking at the right-hand side of the structure in FIGURE 9.
Figure 11:
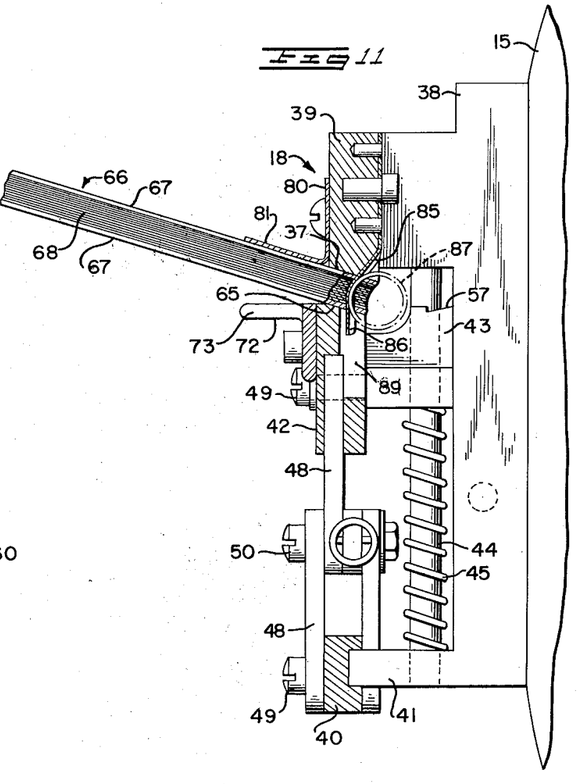
FIGURE 11 is an enlarged fragmentary vertical sectional view on line 11—11 of FIGURE 9.

Referring particularly to FIGURES 9, 10 and 11, each clamping device 18 comprises a pair of blocks 38, each of which is secured to one of the reel members 15, the blocks 38 being alined with each other transversely of the apparatus, that is, parallel to the axis of the shaft 11. Across the blocks 38 and secured thereto is a transverse bar 39 having an inclined lower face 37 for a purpose to be described. At a point spaced substantially below the bar 39 another stationary cross bar 40 is anchored to a lateral extension 41 formed on the bottom of each block 38. At a point spaced above the stationary cross bar 40 is a vertically movable bar 42, and between the cross bar 42 and each of the blocks 38 is arranged a latch block 43 slidably mounted on vertical stationary rods 44 fixed to the blocks 38. Between each lateral projection 41 and the associated block 43 is arranged a compression spring 45, and these springs bias the latch blocks 43 for upward movement from the position shown in FIGURE 10 to that shown in FIGURE 11.

Referring to FIGURE 9, pairs of links 48 are pivotally connected as at 49 to the bars 40 and 42, the links of each bar being pivotally connected to each other as at 50. The pivotal connections of these links carry small plates 51, and a tension spring 52 is connected between the plates 51 to urge the pivotal connections 50 toward each other to tend to urge the bar 42 upwardly, thus assisting the springs 45.

The springs 45 are normally maintained compressed, and the spring 42 under tension by means of latches 54 pivoted as at 55 to the respective blocks 38. Each latch 54 is provided with a detent finger 56 (FIGURE 10) overlying a shoulder 57 of the associated latch block 43 to normally hold the latch blocks in the solid line position shown in FIGURE 10. A spring 57 biases each latch 54 to its operative position shown in FIGURE 10.

As previously stated, the final step in the operation of the apparatus as a whole is the releasing of the books from the clamping devices, and this releasing is accomplished by moving the blocks 43 from their positions shown in FIGURE 11 to the solid-line position shown in FIGURE 10 by compressing the springs 45 and extending the spring 52. This is accomplished by a mechanism indicated as a whole by the numeral 59 (FIGURE 1) located at the final station of operation. This mechanism for moving the blocks 43 to their normal position shown in solid lines in FIGURE 10 forms no part per se of the present invention, and it may be assumed that this operation, so far as the present invention is concerned, is performed in any suitable manner. When the blocks 43 are moved from the position shown in FIGURE 11 to the position shown in solid lines in FIGURE 10, the detent 56 snaps over the shoulder 57. The parts remain in such positions until the latch 54 is released by operation, in a manner to be described, of a member 59 (FIGURE 1) which engages the lower end of the latch 54 to swing the latch in a clockwise direction to its broken-line position in FIGURE 10, thus releasing the blocks 43.

Figure 12:
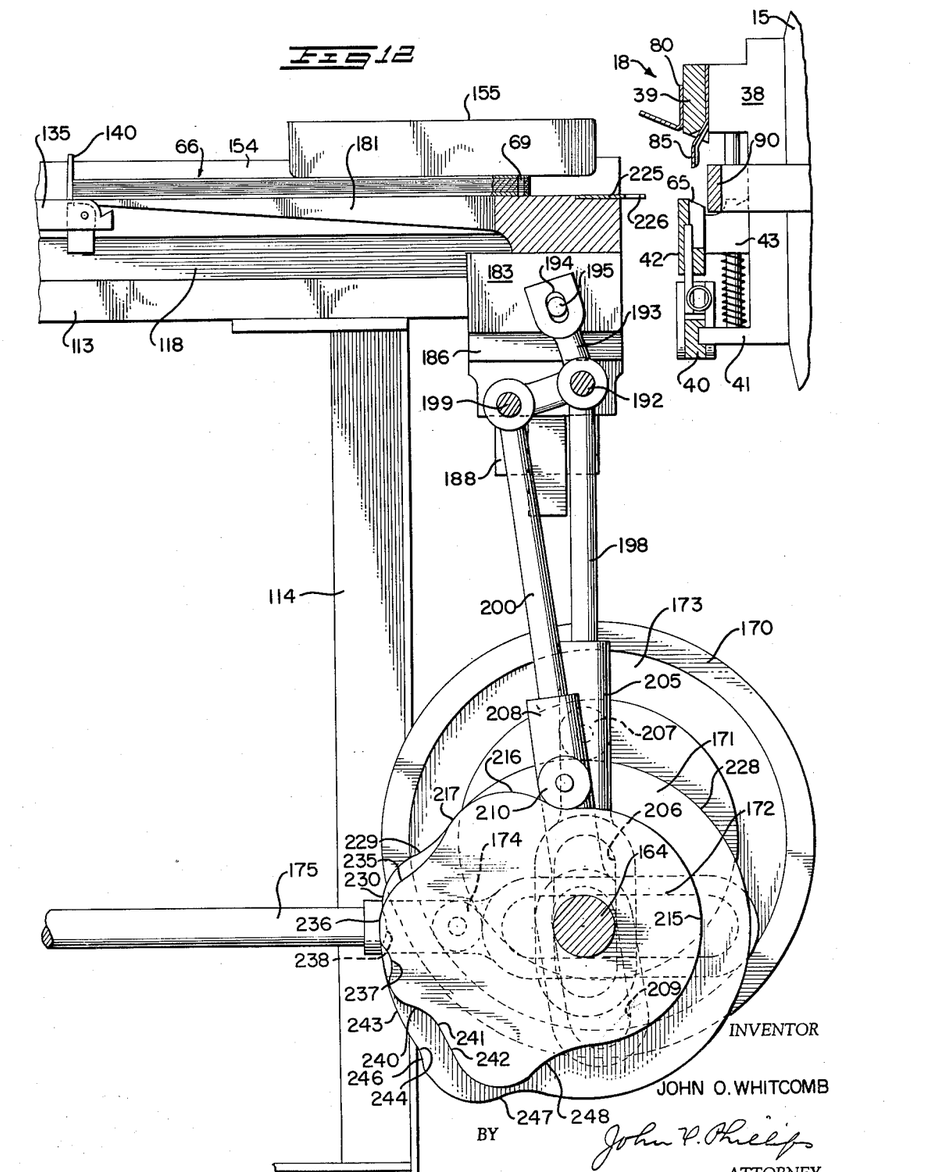
FIGURE 12 is an enlarged fragmentary vertical sectional view showing the right-hand end of the structure shown in FIGURE 3 with the control cams shown in one position.
Figure 13:
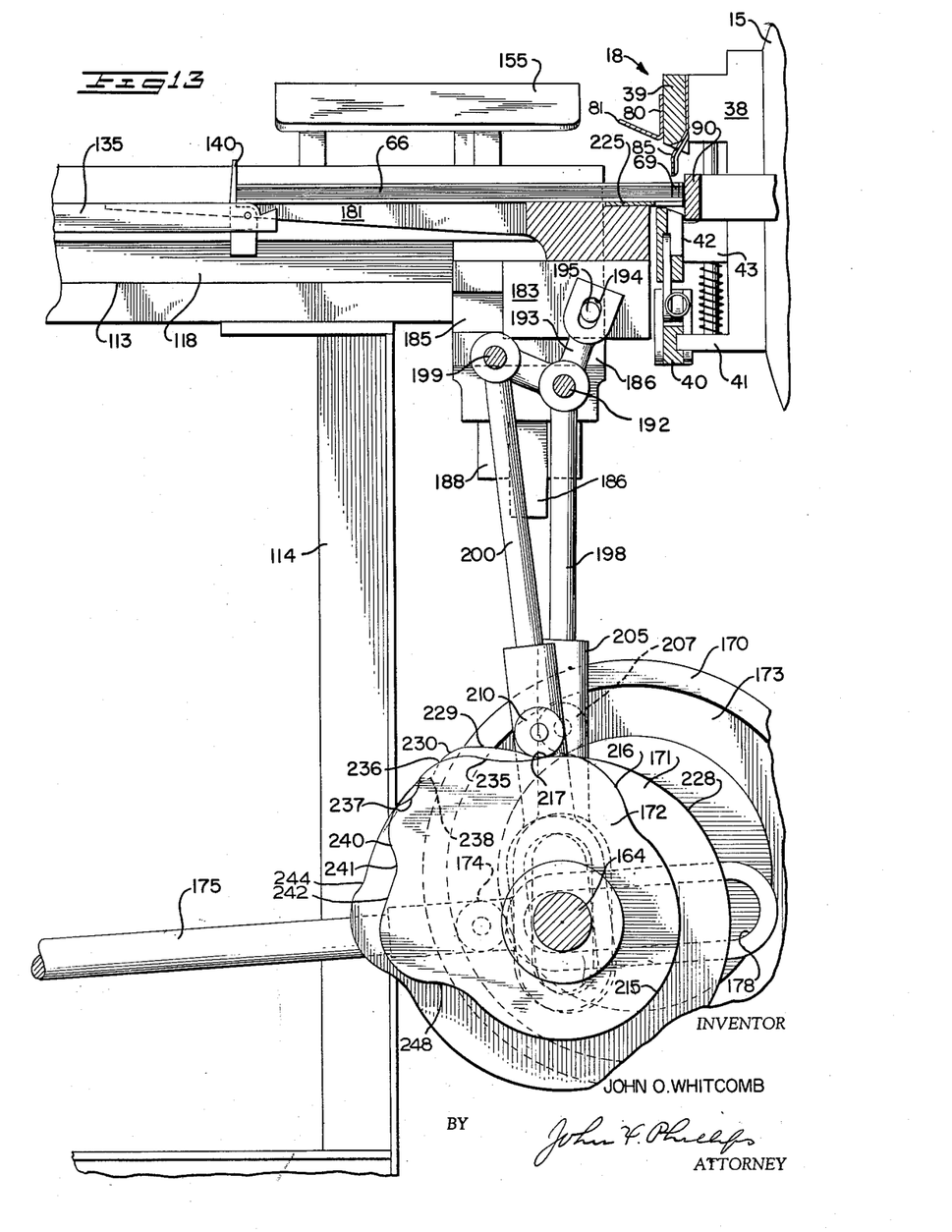
FIGURE 13 is a similar view showing the control cams in the next succeeding position.

The bar 42 (FIGURE 10) is provided with an inclined upper surface 65 parallel to the inclined surface 37 of the stationary bar 39, and these surfaces are movable in a manner to be described to grip therebetween the book 66 as shown in FIGURE 11, such book, in this case, comprising board covers 67 and pages 68 therebetween punched to provide coil receiving openings 69 (FIGURES 12 and 13).

To the face of the block 42 remote from the reel 15 is secured an angle iron 72 the upper flange of which is flush with the adjacent upper edge of the bar 42. The top flange of the angle iron 72 is cut away as at 73 (FIGURES 9 and 11) for a purpose to be described.

The book is clamped between the inclined surfaces 37 and 65 toward the left-hand side of the mechanism shown in FIGURE 9. To prevent the spring 45 at the right-hand side of the apparatus and the spring 52 from moving the right-hand end of the bar 42 too high, a vertically adjustable stop 75 is arranged in the path of travel of the angle iron 72, such stop being carried by a block 76 and being vertically adjustable by operating a screw 77. The stop 75 is so positioned that when the book is in place, the parallel relation of the inclined surfaces 37 and 65 from end to end is assured. The stop 75 is vertically adjustable to accommodate the apparatus to books of different thicknesses.

A plate 80 is fixed to the bar 39 and has inclined flange portions 81 the lower faces (FIGURE 11) of which are flush with the inclined surface 37 to provide additional bearing surface for the top of the book when clamped in position. The purpose of the flange portions 81 is to prevent the inertia of the free end of the book from tending to carry it beyond each successive station when the reel 15 is abruptly stopped at such station, thus preventing the breaking of the cardboard back 67 of the book. The flange portions 81 are shown separated in FIGURE 9, the purpose of this separation being to take care of conditions at the last stage of operation of the mechanism, and the separation makes no difference so far as the present invention is concerned.

The bar 39 carries a plurality of depending hooks 85

(FIGURES 9, 10 and 11) grooved as at 86. The hooks 85 are inclined from the vertical transversely of the apparatus as shown in FIGURE 9 to correspond with the pitch of the helical wire 87 (FIGURE 11), employed with certain types of books, which wire is inserted through the book openings 69 in the next stage of operation. The hooks 85 themselves are inserted in certain of such hook openings in the operation of the present invention. Two of such hooks have been shown in FIGURE 9, but it may be understood that any number may be employed and they will correspond in position to certain of the book openings 69. The hooks 85 have their lower ends in a vertical plane, as viewed in FIGURES 10 and 11, for initial movement of the book, as described below, for the insertion of the free ends of such hooks in certain of the book openings. Intermediate their ends, the hooks are curved as at 88 to match the approximate diameter of the helical wire 87. The bar 42 is suitably cut away as at 89 to receive the ends of the hooks 85 when the clamping device is in operation as in FIGURES 11 and 15.

When the end of the book is inserted, by means to be described, in the clamping device, as shown in FIGURE 13, movement of the book is limited by a stop plate 90 (FIGURES 2, 12 and 13) carried by arms 91 pivoted to the frame members 14 as at 92. These arms are connected together at the ends opposite the plate 90 by a bar 93, one end of which extends beyond the upper frame member as viewed in FIGURE 2 and is provided with another arm 94, to the free end of which is connected a short plate section 95 forming in effect a part of the plate 90. The elements 90 and 95 prevent the book from moving beyond its proper position to aline the book openings 69 with the hooks 85.

As soon as movement of the book is arrested in the manner stated, it is necessary to move the stop member 90 out of position. One of the arms 91 is provided with an extended arm 98 carrying a roller 99 operative over a cam 100 carried by a suitably journaled shaft 101. This shaft is driven by a chain 102 driven from any suitable source of power such as the shaft 20.

The shaft 101 also carries cams 105 for operating a mechanism to release the latch 54, shown in operative position in FIGURE 10. Each cam 105 is engaged by a roller 106 carried by a reciprocating arm 107, each such arm being reciprocable in a guide 108. These guides may be fixed against movement by connection to any stationary part of the apparatus. The forward ends of the rods 107 turn inwardly from the elements 60 previously described. At the proper point according to the timing of the rotation of the shaft 101, the cams 105 will move the rollers 106, and hence the elements 60, forwardly as indicated in broken lines in FIGURE 10 to release the latches 54.

A book supply table indicated as a whole by the numeral 112 is arranged adjacent the inlet side of the apparatus. This table comprises a pair of side guides 113 (FIGURES 1, 3 and 4) supported on legs 114. A carriage indicated as a whole by the numeral 115 is supported for longitudinal movement relative to the side bars 113. This carriage comprises parallel side bars 116 carrying rollers 117 operating in channels 118. The carriage 115 further comprises cross members 119 connected intermediate their ends by a bar 120. A block 122 is clamped as at 123 to the bar 120 and is provided with depending ears 124 pivoted as at 125 to a link 126. The free end of the link 126 is pivoted as at 127 to the upper end of an arm 128 supported by a shaft 129 which may be welded to side frame members 130 forming a part of the table 112.

The carriage 115 is provided with spaced parallel pusher bars 135. The table 112 supports a longitudinal relatively narrow platform section 136 on opposite sides of which and spaced therefrom are platform sections 137 and 138. The pusher bars 135 and platform sections 136, 137 and 138 have their upper surfaces flush with each other.

Figure 5:
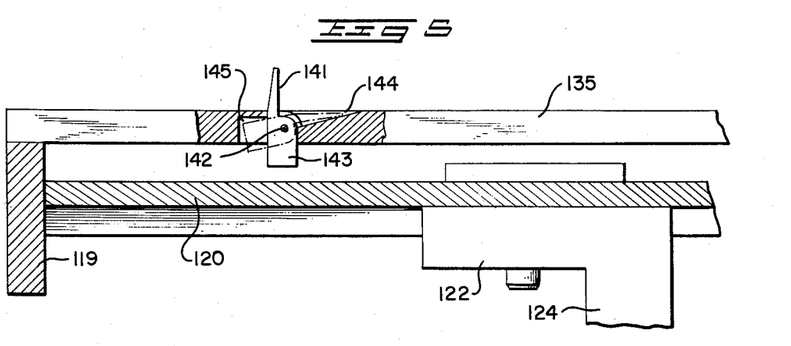
FIGURE 5 is an enlarged vertical fragmentary sectional view on line 5—5 of FIGURE 4.

The pusher bars 135 are provided with forward and rear pusher fingers 140 and 141 which may be identical in construction and one of which is shown in detail in FIGURE 5. Referring to FIGURE 5, the finger 141 shown therein is pivoted as at 142 to the associated bar 135 and is counterweighted at the bottom as at 143 to bias the finger 141 to vertical position. This finger, when swung as described below to the broken line position in FIGURE 5, enters a recess 144 formed in the bar 135, while the counterweight 143 enters a correspondingly shaped recess 145.

Figure 4:
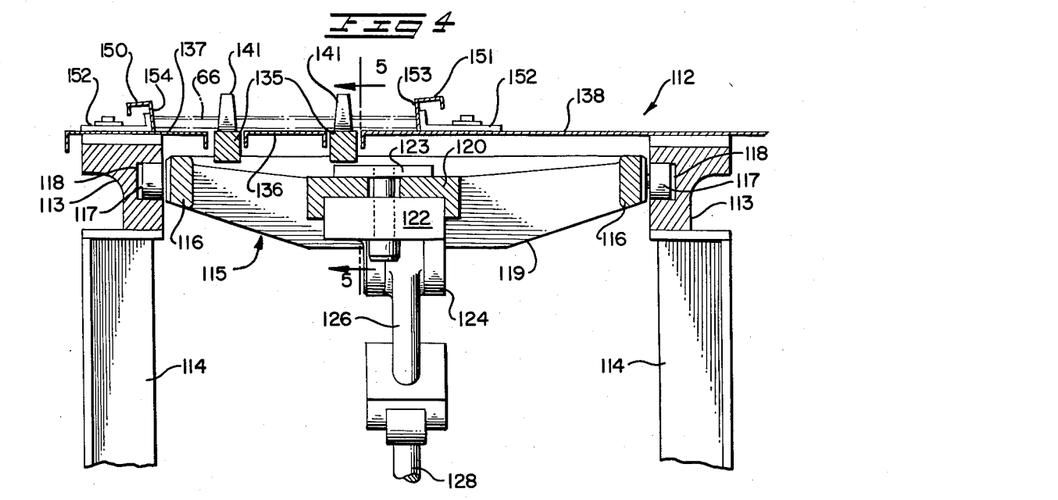
FIGURE 4 is an enlarged fragmentary transverse sectional view on line 4—4 of FIGURE 3.
Figure 6:
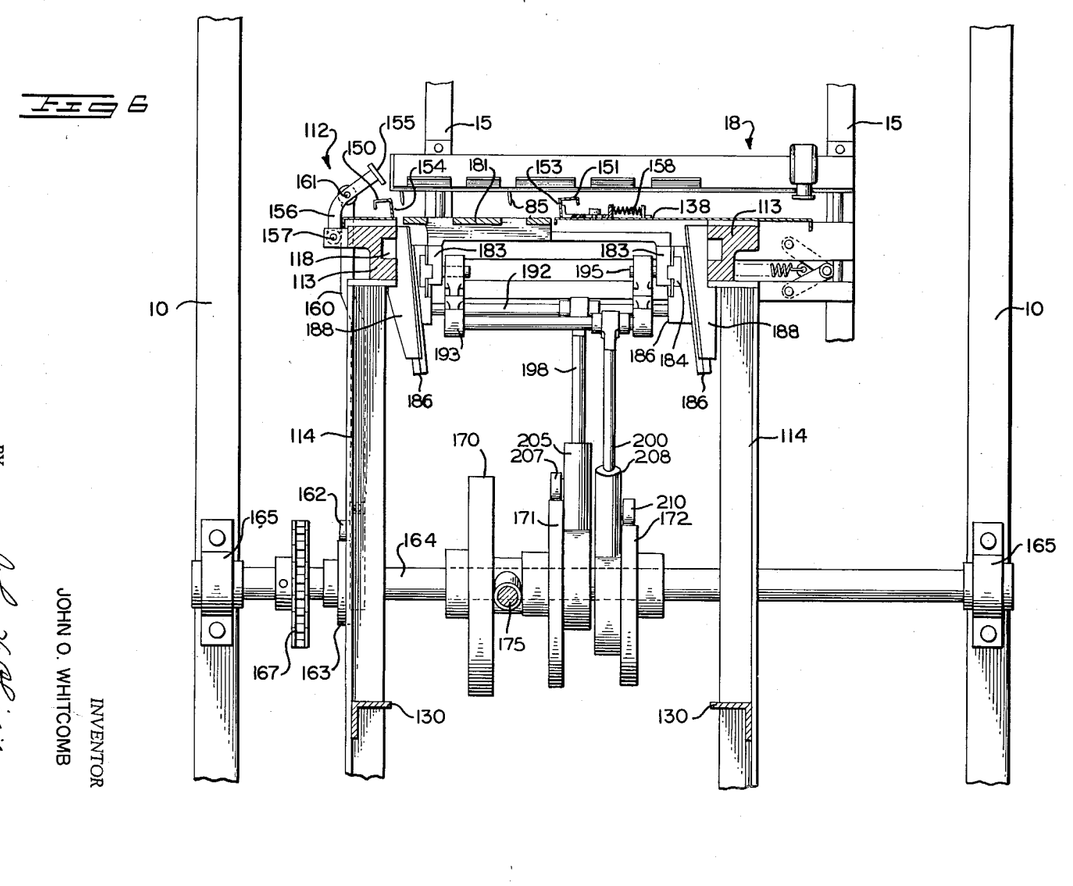
FIGURE 6 is a fragmentary transverse vertical sectional view on line 6—6 of FIGURE 3.
Figure 7:
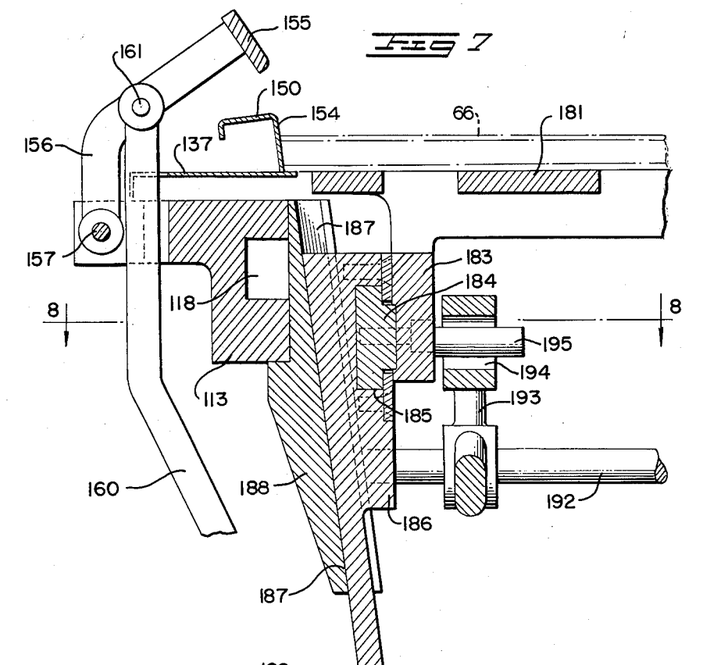
FIGURE 7 is an enlarged fragmentary sectional view on line 7—7 of FIGURE 3.
Figure 8:
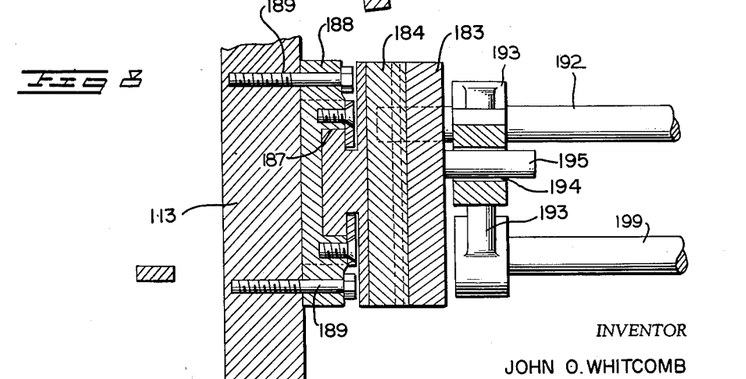
FIGURE 8 is an enlarged horizontal sectional view on line 8—8 of FIGURE 7.

The platform sections 137 and 138 respectively carry longitudinal side guides 150 and 151 fixed in position by brackets 152 which are adjustable on the platform sections 137 and 138 according to the width of the books to be bound. Referring to FIGURES 4, 6 and 7, it will be noted that the side guide 150 is provided with a guiding flange 154 inclined from the vertical. The side guide 151 is provided with a similar flange 153 parallel to the flange 154. These guide flanges are inclined to similarly incline the edges of the book together with the coil receiving openings 69 to arrange such openings at the proper angle relative to the hooks 85. The inclination of the hooks 85 is changed for certain different books as pointed out below. This does not affect the present invention or the efficiency of the apparatus.

The side guides 150 and 151 rather loosely receive the book therebetween adjacent the carriage 115. Adjacent the reel, however, one of the brackets 152 is arranged to be sprung inwardly by any suitable spring 158. The flexing of the side guide 151 causes the guide flange 153 to rather snugly engage the book, and this is done to compensate for variations in the width of the book. Since some pressure is exerted against the edge of the book by the guide flange 153, there is a tendency for the book as it approaches the reel to ride upwardly over the flange 154. This is prevented by the use of a hold-down plate 155 carried by arms 156 pivotally supported as at 157 by the adjacent side bar 113. The hold-down plate 155 normally occupies the upper position shown in a number of the figures, for example, FIGURES 6 and 7. The hold-down plate is movable, as described below, to an operative position, shown in FIGURE 12, engaging the top of the book to hold it in proper position. When in the position shown in FIGURE 12, the hold-down plate 155 rests on the book solely by gravity, and the hold-down plate is movable to its upper position by operation of an arm 160 pivoted as at 161 to one of the arms 156. The arm 160 is provided at its lower end with a roller 162 (FIGURE 6) engageable with a cam 163 mounted on a transverse shaft 164. In accordance with the timing of the cam 163, the arm 160 releases the hold-down plate 155 for movement to its operative position shown in FIGURE 12.

The shaft 164 is journaled in bearings 165 secured to the side frames 10. The shaft 164 is driven by a chain 167 passing around a suitable sprocket on the shaft 20. The shaft 164 carries three cams 170, 171 and 172. The cam 170 is provided with a circular groove 173 in which is movable a roller 174 carried by a rod 175, one end of which (FIGURES 1 and 3) is pivoted as at 176 to the arm 128. The right-hand end of the rod 175, as viewed in FIGURES 12–15, is slotted as at 178 to ride on the shaft 164 to be supported thereby. The cam groove 173 is circular but is eccentric to a substantial degree relative to the shaft 164. Upon a given rotation of the cam 170, the arm 175 actuates the pusher bars 135 to move a book to the right as viewed in FIGURES 2, 3 and 12, the book being propelled by the fingers 141. The book is left with its following edge approximately in the position of the fingers 140 in engagement with a stop 180, whereupon the pusher bars 135 are retracted and, in their next operation, the pusher fingers 140 will move the book again to the right in FIGURE 2 to rest on an insert table 181 having slots 182 corresponding to the spaces between the platform sections 136 and 137 to permit movement of the bars 135 to their limit of movement. The advancing end of the insert table 181 is carried by a pair of blocks 183, each of which carries on its outer face a rail 184 longitudinally slidable in a groove 185 formed in a crosshead 186. These crossheads, in turn, operate in grooves 187 formed in guides 188 fixed as at 189 to the side bars 113. The grooves 187 are inclined from the vertical at the same angle as the pitch of the coils to be inserted in the book, that is, at the same angle as the guide flanges 154 and 153 (FIGURE 4) and the hooks 85.

A shaft 192 extends between and is connected to the crossheads 186 and supports adjacent each such crosshead a bell crank lever 193. One arm of each bell crank lever is slotted as at 194 to receive a pin 195 carried by the adjacent block 183. Intermediate its ends, the shaft 192 is connected to a depending rod 198. The second arms of the bell crank levers are connected by a rod 199 pivoted to a depending rod 200.

The rod 198 is provided with an enlarged lower end 205 having a slot 206 slidably receiving the shaft 164. The enlargement 205 carries a roller follower 207 operating over the cam 171. The rod 200 has an enlarged lower end 208 slotted as at 209 to slidably receive the shaft 164, and the enlargement is provided with a roller follower 210 operating over the cam 172.

Referring to FIGURES 12–15, inclusive, the cam 172 is provided with a substantially semicircular dwell portion 215 and accordingly, during approximately one-half revolution of the shaft 164, the rod 200 will be stationary. Approximately at the point shown in FIGURE 12, the follower 210 encounters a rise 216 which ends approximately at the point 217. From the position shown in FIGURE 12 to the position shown in FIGURE 13, therefore, the roller 210 will be moved upwardly to move the rod 200 upwardly and rock the bell crank lever 193 about the pivot 192 to advance the insert table from the position shown in FIGURE 12 to that shown in FIGURE 13. Assuming that a book is in position in engagement with the pusher fingers 140, the book will then be positioned with two of the openings 69 alined with the hooks 85. In such position of the book, the end thereof beneath the hooks 85 will be supported by fingers 225 notched as at 226 to straddle the lower ends of the hooks 85 as the book moves upwardly relative to the hooks.

The cam 171 is provided with a circular portion 228 over which the follower 207 moves while the follower 210 is moving over the cam portions 215 and 216. The semicircular dwell portion 228 terminates at the point 217 previously described, and the cam 171 is then provided with a rise 229 over which the follower 207 operates. This rise terminates approximately at the point 230 and during movement of the follower 207 over the rise 229, the rod 198 will be elevated to lift the shaft 192 and thus raise the crossheads 186, thus elevating the insert table 181 to lift the book 66 to initiate the entrance of the hooks 85 into the openings 69.

Corresponding in position to the rise 229, the cam 172 is provided with a rise 235 circumferentially offset from the rise 229 to compensate for the offsetting of the rollers 210 and 207 to simultaneously lift such rollers. Inasmuch as the lifting movement imparted to the shaft 192 would tend to lift this shaft relative to the rod 200, the rise 235 is provided to lift the rod 200 and thus lift the shaft 199 to maintain the angular position of the bell crank levers 193 during the lifting of the insert table 181 by the cam rise 229. In the absence of the rise 235, the lift of the pin 192 would swing the bell crank levers 193 in a counterclockwise direction to retract the insert table 181.

The rise 235 terminates approximately at the point 236 beyond which is a dwell or notch 237, and when the roller 210 operates over the notch 237, the rod 200 drops momentarily. Approximately coinciding with the point 236, the cam 171 is provided with a dwell portion 238 formed as a relatively small notch and, as the roller 207 passes thereover, the rod 198 is moved downwardly and then upwardly simultaneously with the rod 200 to provide a jogging motion of the insert table to effect the orientation of the hooks 85 relative to the openings 69. The jogging action is transmitted vertically to the shaft 192 and simultaneously to the rod 199 as the roller 210 passes over the notch 237. This causes a direct vertical action of the bell crank levers 193, and accordingly the jogging action of the book takes place to a slight extent vertically.

Beyond the end of the notch 237, the cam 172 drops off at 240, such drop terminating at the point 241. Beyond the point 241, the cam 172 again rises slightly at 242. This rise is related to the adjacent portion of the cam 171. The latter cam is provided with a concentric surface 243, starting at the end of the dwell 238 and terminating approximately at the point 244. As the roller 210 is lowered in passing over the drop-off 240 (FIGURE 14) the follower 207 is maintained on the concentric surface 243 to hold the shaft 192 in its upper position. The bell crank levers 193 are thus rocked during this period to the position shown in FIGURE 14 to back off the insert table 181 so that the fingers 225 are moved out of the way of the blocks 39 and 42 for the later movement of the latter of these blocks upwardly, as described below.

Figure 14:
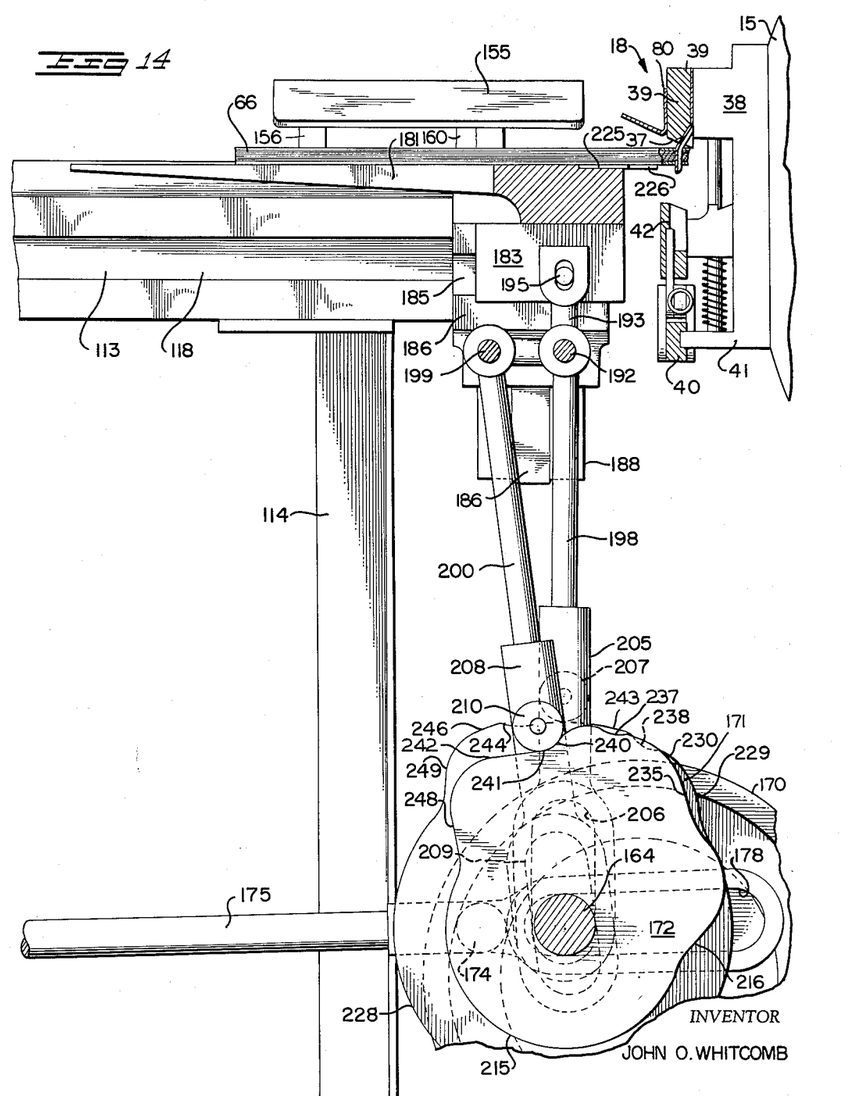
FIGURE 14 is a similar view showing the control cams in a still further advanced position.
Figure 18:
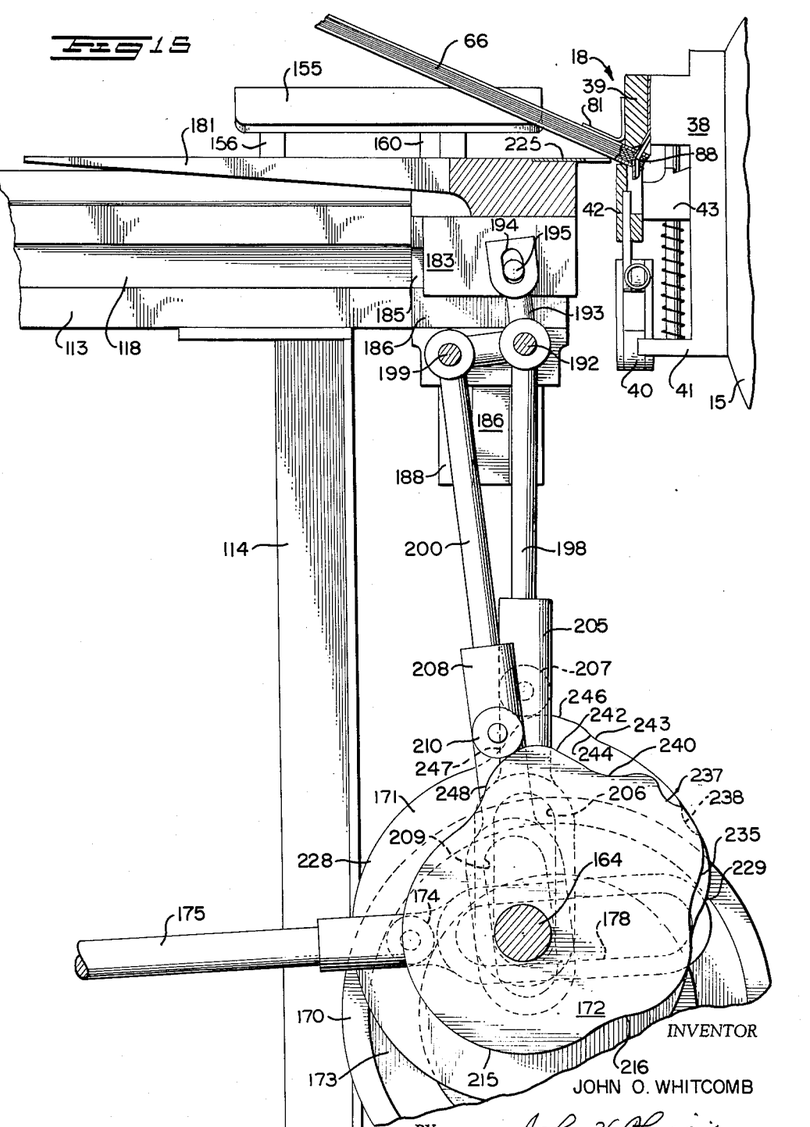

With the fingers 225 retracted to the position shown in FIGURE 14, the follower 207 then passes over a rise 246 of the cam 171 (FIGURE 15) to again elevate the rod 198 and impart similar movement to the insert table and fingers 225. At the same time, the follower 210 passes along the rise 242 to compensate for the position of the shaft 199 relative to the shaft 192 to give a proper lift to the book by the fingers 225. Beyond the rises 242 and 246, the cams 171 and 172 drop off as at 247 and 248, the rollers 207 and 210 then returning to contact with the concentric cam surfaces 228 and 215 respectively. It is while the insert table is in the book lifting position shown in FIGURE 15 that the latch mechanism (FIGURE 10) is released, whereupon the springs 45 and 52 move the block 42 upwardly to the book clamping position shown in FIGURE 15. The cam drop-offs 247 and 248 result in the lowering and retracting of the insert table to the position in FIGURE 12, ready for the feeding of the next book.

*Operation*

Figure 3:
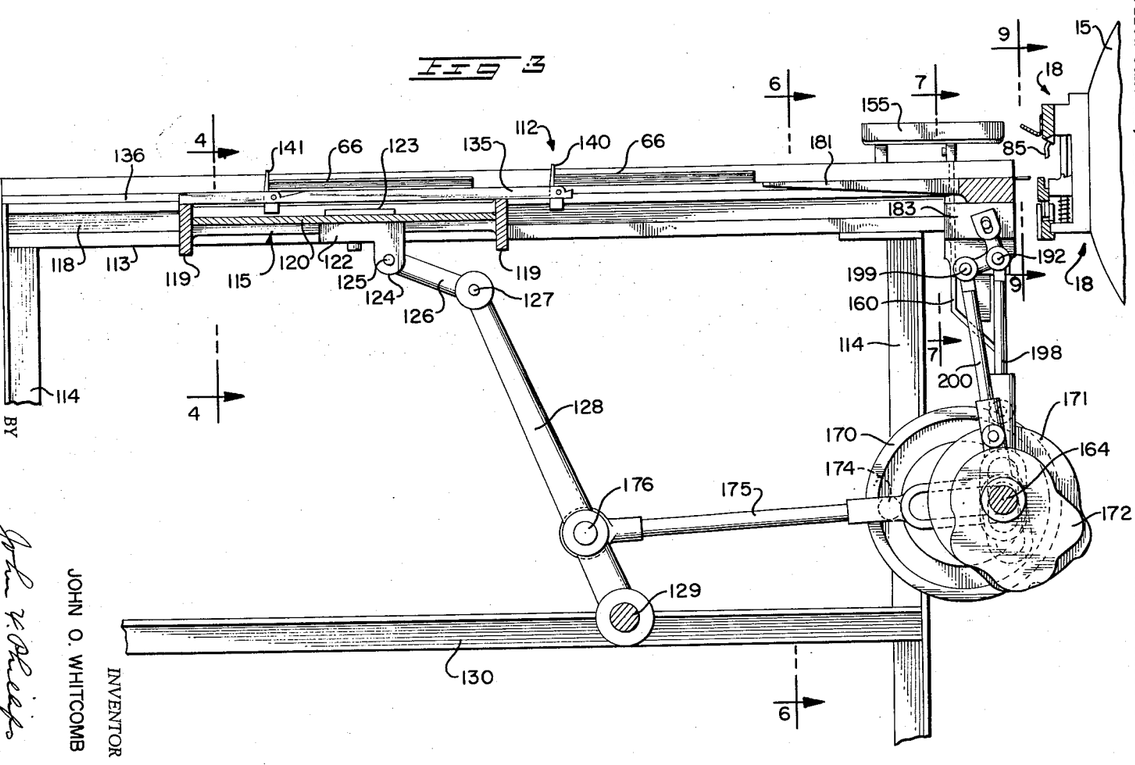
FIGURE 3 is a vertical longitudinal sectional view on line 3—3 of FIGURE 2.

The parts normally occupy the positions shown in FIGURES 1, 2, 3 and 10, the carriage 115 being retracted to its limit of movement to the left in FIGURES 1, 2 and 3 by virtue of the fact that the roller 174 is arranged its maximum distance from the axis of rotation (shaft 164) of the cam 170. The assembled books and covers are fed one at a time, usually manually, to a position on the platform sections 136 and 137 between the pairs of pusher fingers 140 and 141 with the openings 69 of the books at the right-hand edge thereof in FIGURE 2. The shaft 164 is rotated by the drive means shown in FIGURE 1 and turns in a clockwise direction. As the cam 170 rotates, the roller 174, traveling in the groove 173, will move closer to the shaft 164, thus moving the rod 175 to the right in FIGURE 1 to move the pusher bars 135 in the same direction. The pusher fingers 141 in the first half rotation of the cam 170 will be moved to the right approximately to the point where the pusher fingers 141 occupy the positions of the pusher fingers 140 in FIGURE 2, the following edge of the book thus being engaged with the right-hand limit of the stop 180 (FIGURE 2), whereupon the next half rotation of the cam 170 retracts the pusher bars 135 to the normal position shown in FIGURE 2 for the reception between the pusher fingers of the next successive book.

When the cam 170 starts its next rotation, the pusher fingers 140, engaging behind the previously moved book, will effect movement thereof to the right in FIGURE 2 onto the insert table 181. The position of the parts under such conditions is shown in FIGURE 13, the roller 174 occupying in the groove 173 its position closest to the axis of the shaft 164 and the leading edge of the book being positioned against the stop 90. Under such conditions, the line of openings 69 in the book lies in a plane directly below the plane of the free ends of the books 85.

It will be noted that, at this point, the follower roller 207 will be at the point 217 just ahead of the cam rises 229 and 235. During the next following portion of the revolution of the cams, the rise 229 will engage the follower roller 207 to move the rod 198 upwardly together with the shaft 192, crosshead 186, blocks 183, and insert table 181.

It will be noted that the movement of the book into the position described takes place between the longitudinal guides 150 and 151, the inner walls 154 and 153 of which are inclined from the vertical to correspond to the inclination of the hooks 85, which inclination in turn corresponds to the pitch of the helix of the wire to be inserted in the book at a later stage of operation of the apparatus, forming no part of the present invention. It also will be noted that the grooves 187 (FIGURE 7) are inclined from the vertical at the same angle. With the hooks 85 arranged in alinement with certain openings 69 of the book, the lifting of the insert table moves the leading edge of the book directly in alinement with the hooks for the insertion thereof in the openings corresponding in position with the hooks.

It also will be noted (FIGURE 13) that when the lifting operation provided by the cam 229 takes place, the plates 225 will project outwardly to the free end of the book with the notches 226 surrounding the hooks 85 so that the latter can pass freely through the book.

When the rod 198 is moved upwardly by the cam rise 229, the insert table would be retracted if the shaft 199 were permitted to remain stationary while the shaft 192 moves upwardly. The lifting movement of the shaft 192 is compensated for by the cam rise 235 which, engaging the roller 210, will elevate the shaft 199 to an extent corresponding to the lifting of the shaft 192, thus preserving the angular positions of the arms of the bell crank lever 193 as viewed in FIGURE 13.

The raising of the insert table causes the straight lower ends of the hooks 85 to enter the openings 69, the parts now being positioned as shown in FIGURE 14. From such positions, the cams 171 and 172 will continue to rotate and, when the roller 207 passes beyond the point 230, it will drop slightly into the notch 238 while the roller 210 simultaneously drops into the notch 237, thus momentarily slightly lowering and then raising the bell crank levers 193 to effect a vertical jogging of the insert table. Thus the elements of the book will be jogged to make sure that the lower ends of the hooks fit properly in the openings 69 prior to the carrying out of following operations of the apparatus.

After the rollers pass over the cam portions 237 and 238, the roller 210 will drop off the cam portion 240 to the portion 241 while the roller 207 remains elevated. Such position of the parts is shown in FIGURE 14, and it will be apparent that the holding of the shaft 192 in its previous position, while the roller 210 drops over the cam portion 240, results in the counterclockwise rocking of the bell crank levers 193 from the position shown in FIGURE 13 to the position shown in FIGURE 14. This horizontally retracts the insert table to the position shown in FIGURE 14, the plates 225 and their notches 226 thus being moved away from the bars 39 and 42, out of the path of travel of the subsequent vertical movement of the block 42.

With the cam parts arranged in the position shown in FIGURE 14 and with the plates 225 retracted as stated, the cams 171 and 172 continue to rotate and the rollers 207 and 210 will move over the cam rises 246 and 242 respectively, thus effecting a lifting movement of the insert table as shown in FIGURE 15. Under such conditions, the free ends of the plates 225, engaging the lower cover of the book at the point indicated in FIGURE 15, will swing the book 66 to the position shown in FIGURE 15. The swinging of the book in the manner referred to causes the openings 69 in the book to come into contact with the curved hook portions 88 (FIGURE 15). All of the openings 69 will now assume arcuate shapes ready for the later threading therethrough of the helical binder. With the book in such position, the upper cover thereof will engage the inclined face 40 of the bar 39 and also the projecting plate 81, the lower face of which is flush with the face 40. The cam parts are now in the positions shown in FIGURE 15, and the book clamping elements of the reel 15 are now ready for operation.

At this point, the rollers 106 (FIGURE 2) are moved to the left by the cams 105, whereupon the fingers 60 (FIGURES 2 and 10) engage the lower ends of the pivoted latches 54, the detent fingers 56 thus being released from the shoulders 57. The springs 45 (FIGURE 9) thereupon effect upward movement of the bar 42, assisted by the tension spring 52 which pulls together the pivot pins 50 to straighten out the links 48. The book throughout its width will then be clamped between the faces 37 and 65, as shown in FIGURE 11. Since the right-hand edge of the book, as viewed in FIGURE 9, will be substantially spaced from the corresponding end of the bar 39, there is a chance that the upward force exerted by the spring 45 would tend to tilt the bar 42 at a slight angle to the horizontal. For this reason, the adjustable stop 75 (FIGURE 9) is provided, the bottom of this stop engaging the angle iron 72 to stop upward movement of the bar 42 in a horizontal position.

The operation just described takes place with the insert table 181 retracted horizontally but moved vertically above its normal position as shown in FIGURE 15. Upon continued rotation of the cams 170 and 171, the rollers 207 and 210 will drop off the cam portions 247 and 248 respectively, thus lowering both of the shafts 192 and 199, whereupon the insert table moves downwardly to its normal position with its top surfaces flush with the members 136 and 137. The rollers 207 and 210 will now approach and then ride over the concentric cam surfaces 228 and 215 respectively, during which movement the insert table remains in its normal vertical position pending the starting of the next operation.

As the cams 171 and 172 rotate through the various stages described above, it will be apparent that the cam 170 will have been rotating therewith. The pusher bars 135 will be at their right-hand limit of movement when the parts are in the positions shown in FIGURE 13. Thereafter, the roller 174 will travel in the groove 173 and its distance from the axis of the shaft 164 will increase, thus moving the rod 175 to swing the arm 128 from its furthest advanced position to its normal or retracted position shown in FIGURE 3.

As the book previously referred to is moved toward the reel, the pusher fingers 141 will have been pushing the next following book in the same direction and the limit of movement of the pusher fingers, when the parts reach the positions shown in FIGURE 14, will position the following edge of the book in engagement with the pusher fingers 141 just past the stop 180 (FIGURE 2). This stop will maintain the next book in the position thus established while the cam 170 rotates to return the pusher bars to normal position. The pusher fingers 140, moving to the left from the position shown in FIGURE 13, will encounter the advancing edge of the next following book and will be swung downwardly thereby to move beneath the book, and when the following edge of the book is passed, the pusher fingers 140 will then swing upwardly to their normal vertical positions, such movement taking place because of the counterweights 143 (FIGURE 5) carried by the lower ends of the pusher fingers.

As previously stated, and referring to FIGURE 4, the guide walls 154 and 153 are inclined from the vertical and they fairly snugly engage the edges of the books to maintain the pages and covers in proper angular alinement as the books move over the members 136 and 137 and along the insert table 181. This engagement of the edges of the books with the walls 154 and 153, as the book is pushed longitudinally of the table, tends to cause the left-hand edge of the book, as viewed in FIGURE 4, to ride upwardly along the wall 154. To insure against such movement and to maintain the book in proper position on the table, the hold-down bar 155 is provided. This bar normally occupies the position shown in FIGURES 3, 6 and 7, for example. The cam 163 (FIGURE 6) engaging the roller 162 holds the arm 160 normally in its upper position completely out of the path of travel of the book. As the book moves along toward the reel 15, however, the cam 163 drops the roller 162, whereupon the hold-down bar 155 drops by gravity to the position in shown FIGURE 12, engaging the top cover of the book solely in accordance with the weight of the bar 155 to insure against the lifting of the left-hand edge of the book, as viewed in FIGURE 7. Thus the book is maintained in its proper lower position in engagement with the insert table until the leading edge of the book moves into the position shown in FIGURE 13. At this point, the cam 163 lifts the roller 162, thus swinging the hold-down bar 155 to its inoperative position out of the way of the book so that the latter is free, during the operations described above, to swing upwardly to the position shown in FIGURES 11 and 15.

After the clamping of the book in the manner described, the reel is indexed to successive stations for the performance of the operations generally described above. The Geneva gear operates after the book is clamped to turn the reel 15 one step to the second work station, at which station the spiral binder 87, shown in dotted lines in FIGURE 11 is threaded through the properly alined openings 69 of the book. The next following clamping device will have been moved into position ready for the reception of the next book.

After such book has been clamped in position, the reel is indexed to its next station, represented by the clamping device 18 at the top of FIGURE 1. At this station, the ends of the spiral binder are first clipped to the proper length and the extremities of the binder are bent to loop them to prevent the protrusion from the book of any raw wire ends. In forming the loops, the extremities of the binder wire are bent inwardly into engagement with the body of the wire. Upon the completion of this operation the reel is indexed to its next following station, at which point the extremities of the wire binder are welded to the body of the coil to prevent being bent outwardly to expose any raw edges of the wire. At the next indexed work station, represented by the right-hand clamping device 18 (FIGURE 1), the book is released to be discharged from the apparatus. It is at the discharge station that the device generally indicated by the numeral 59 operates to move the bar 42 back to the inoperative position shown in FIGURE 10 so that the pivoted latch elements 54 will again engage the blocks 43 to hold the bar 42 in inoperative open position relative to the bar 39 for the reception of the next book when the clamping device 18, thus operated, reaches the loading station indicated at the left side of the reel in FIGURE 1. The specific means for re-setting the bar 42 and associated elements makes no difference so far as the present invention is concerned, and the latch devices may be re-set in any desired manner.

The present invention is concerned with the feeding of successive books to the loading station, the controlling of the books into loading position, the engagement of the books with the hooks 85 and the clamping of the books in position for the performance of successive operations as generally referred to above. Such successive operations form no part of the present invention.

From the foregoing, it will be apparent that the present invention is highly efficient for the rapid successive feeding of books of the type referred to, to a movable structure, shown in the present instance as a reel, so that the books may be properly positioned for the performance thereon of the operations described above. Except for the feeding of the books onto the table 115, the apparatus of the present invention is wholly automatic, the various operations taking place rapidly and sequentially. Each book is clamped in position as shown in FIGURE 11, with the hooks 85 positioned in the openings 69 of the book and with each of these openings curved arcuately to substantially correspond to the diameter of the wire 87 for the smooth and easy threading of the wire through the openings 69.

In connection with the foregoing, it is pointed out that three devices of the invention are inclined to correspond to the pitch of the spiral binders, namely, the hooks 85, the guide flanges 153 and 154 and the inclination of the grooves 187 in the guides 188. It should be pointed out that the inclination of the guide flanges 153 and 154 and the inclination of the grooves 187 need not vary. The apparatus is primarily adapted for use in spiral-binding stenographers' notebooks, and the inclination referred to generally corresponds to the pitch of the spiral binder used with 100-count stenographers' notebooks. As the count becomes smaller, however, for example in 80- or 60-count stenographers' notebooks, the inclination of the hooks 85 is changed to correspond to the pitch of the particular spiral binder being used. Down to a 60-count coil, it is unnecessary to change the inclination of the guide flanges 153 and 154 and the inclination of the grooves 187. When the books to be bound fall below 60-count they become sufficiently thin so that the hook inclination with a 60-count book is retained despite the fact that the smaller diameter spiral binder would have a pitch varying from the inclination of the hooks set for 60-count books. Therefore, in the particular use of the apparatus described, it is not necessary to change the inclination of the hooks below the pitch of spiral binders used for 60-count books.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In an apparatus for threading spiral binders through books having openings at one end thereof for the reception of such binders, a movable structure, a plurality of clamps carried at spaced points by said movable structure for carrying the books successively from a loading station to a binding station, each clamp having movable jaw members normally open in said loading station, means for supporting a book for movement to a position between said jaw members at said loading station with the end of the book provided with said openings arranged between said jaw members, means for effecting such movement of the book, a plurality of hooks carried by one of said jaw members and having straight ends and portions spaced from such ends curved to correspond substantially to the diameter of the spiral binder to be inserted through said openings, said means for supporting said books comprising a horizontal vertically movable insert table adjacent said jaw members, means operative when said end of the book is between said jaw members for moving said insert table to move the book to position certain of said book openings to receive the straight ends of said hooks and thereafter to further move the book to position said certain openings around said curved portions of said hooks, and means thereafter operative for effecting movement of said jaw members into engagement with the book to fix it relative to said movable structure.

2. An apparatus according to claim 1 provided with side guides engaging the book for movement thereof toward said movable jaws, said side guides being inclined relative to the plane of the book to incline the book openings at an angle substantially corresponding to the pitch of the spiral binders to be inserted through said certain book openings, the straight ends of said hooks being inclined substantially at the same angle, and means for guiding said insert table in said upward movement thereof parallel to said inclined ends of said hooks.

3. In an apparatus for threading spiral binders through books having openings in one end thereof for the reception of such binders, a movable structure, a plurality of clamps carried at spaced points by said movable structure for carrying books successively from a loading station to a binding station, each clamp having movable jaw members normally open in said loading station to provide a horizontal space therebetween, means for supporting a book for horizontal movement to a position in said space at said loading station with the end of the book provided with said openings arranged between said jaw members, said supporting means having normally flush horizontal surfaces from end to end and comprising at the end adjacent said jaw members a vertically and horizontally movable insert table, a plurality of hooks carried by the upper jaw member, means operative when said end of the book is between said jaw members for moving said insert table upwardly to position said hooks in certain of the book openings, and means thereafter operative for effecting movement of said jaw members into clamping engagement with the book to fix it with respect to said movable structure.

4. An apparatus according to claim 3 wherein said hooks are provided with straight free lower end portions initially insertable in said certain book openings, and upper portions curved to correspond substantially to the diameter of the spiral binders to be inserted through said book openings, said means for moving said insert table upwardly being operative for moving said certain openings over said straight lower ends of said hooks and then around said curved hook portions prior to movement of said jaw members into clamping engagement with the book.

5. An apparatus according to claim 3 wherein said hooks are provided with straight free lower end portions initially insertable in said certain book openings, and upper portions curved to correspond substantially to the diameter of the spiral binders to be inserted through said book openings, said means for moving said insert table upwardly being operative for moving said certain openings over said straight lower ends of said hooks and then around said curved hook portions prior to movement of said jaw members into clamping engagement with the book, side guides engaging the book for movement thereof between said jaw members, and means for guiding said insert table for said upward movement thereof, said last-named means, said side guides and said hooks being inclined at an angle from the vertical to correspond substantially to the pitch of said spiral binders.

6. In an apparatus for threading spiral binders through books having openings at one end thereof for the reception of such binders, a movable structure, a plurality of clamps carried at spaced points by said movable structure for carrying the books successively from a loading station to a binding station, each clamp having jaw members normally open in said loading position to provide a horizontal space therebetween, one jaw member of each clamp being fixed to said movable structure and the other being movable relative to said one jaw member, horizontal supporting means over which the book is horizontally movable to position in said space the end of the book provided with said openings, said horizontal supporting means comprising an upwardly and downwardly movable insert table, means for effecting said movement of the book over said supporting means, downwardly projecting hooks carried by said one jaw member and having lower free ends arranged above the path of travel of said book into said space, and operating means comprising a plurality of cams for effecting said movement of the book over said supporting means, and then upward movement of said insert table to position said hooks in certain of the book openings and for then effecting movement of said other jaw member toward said one jaw member to clamp the book between said jaw members.

7. An apparatus according to claim 6 provided with side guides engageable with the edge of the book as it is moved over said supporting means, means engaging and guiding said insert table for said upward and downward movement, the lower ends of said hooks being straight, said straight ends of said hooks, said side guides and said means for guiding said insert table for upward and downward movement being inclined from the vertical at an angle corresponding substantially to the pitch of the spiral binder to be threaded through said book openings.

8. An apparatus according to claim 7 wherein said hooks above said straight ends thereof are curved to correspond substantially to the diameter of the spiral binders, the connections between said operating means and said insert table moving the latter to an upper limit of movement with said certain openings engaged with the curved portions of said hooks, said clamping jaws being biased to closed position and having means normally holding them in open position, and means operative after said certain openings are engaged with the curved portions of said hooks for releasing said means for normally holding said clamping jaws in open position whereby said jaws move into clamping engagement with the book to fix it with respect to said movable structure.

9. Apparatus according to claim 8 wherein said insert table is provided with plates projecting from the end thereof adjacent said movable structure and notched at their ends for movement therebetween of said hooks when the book is moved to position said straight ends of said hooks in said certain openings, said cam means thereupon operating to withdraw said plates from between said jaw members and then move said insert table upwardly to position the book with said certain openings extending around said curved portions of said hooks after which said jaw members are movable into clamped position with the book.

10. In an apparatus for threading spiral binders through books having openings at one end thereof for the reception of such binders, a movable structure, a clamp carried by said movable structure for carrying a book from a loading station to a binding station, said clamp having movable jaw member normally open in said loading station to provide a horizontal space therebetween, means for supporting a book for horizontal movement thereof to position said end of the book in said space, downwardly projecting hooks carried by the upper jaw member and having lower free straight ends arranged above the path of travel of said end of the book into said space, said free ends of said hooks being in a vertical plane transversely of the direction of movement of the book, said hooks above said straight ends having portions curved to correspond substantially to the diameter of the spiral binders to be threaded through said openings, said supporting means comprising an insert table adjacent said jaws, means for moving said insert table upwardly for the insertion of said free ends of said hooks into certain of said book openings and then further upwardly to swing the book at an angle to the horizontal with said certain book openings positioned around said curved portions of said hooks, said jaws having adjacent faces parallel to each other and parallel to the book when the latter is swung upwardly to position said certain openings around said curved portions of said hooks, and means operative after the book reaches the latter position for moving said jaws into engagement with the book to fix it relative to said movable structure.

11. An apparatus according to claim 10 wherein said means for moving said insert table comprises a pair of spaced bell crank levers having a pivot support intermediate their ends, means for guiding said pivot support for upward and downward movement, said bell crank levers having upstanding arms pivotally connected to said insert table, said bell crank levers having laterally extending arms, a pivot bar connected between such arms, and cams connected respectively to said pivot support and to said pivot bar and operative for moving said pivot bar to swing said bell crank levers to move said insert table toward said jaw members, then move said pivot support and said pivot bar simultaneously upwardly to elevate said insert table, then move said pivot bar slightly downwardly to withdraw therefrom the end of said pivot table adjacent said jaw members, then simultaneously move said pivot support and said pivot bar upwardly to elevate said insert table to swing the book upwardly from horizontal position to said angular position with said certain openings surrounding said curved portions of said hooks.

References Cited in the file of this patent

UNITED STATES PATENTS

| | | |
|---|---|---|
| 2,300,544 | Freundlich | Nov. 3, 1942 |
| 2,649,120 | November | Aug. 18, 1953 |
| 2,961,012 | Freundlich (B) | Nov. 22, 1960 |
| 2,995,157 | Catini | Aug. 8, 1961 |

FOREIGN PATENTS

| | | |
|---|---|---|
| 799,727 | Great Britain | Aug. 13, 1958 |